Jan. 26, 1954 R. D. PAULEY ET AL Re. 23,776

METHOD OF BARKING LOGS

Original Filed Aug. 20, 1946 3 Sheets-Sheet 1

INVENTORS
ROBERT D. PAULEY
LOUIS A. McCANNA

BY Cook and Schermerhorn

ATTORNEYS

METHOD OF BARKING LOGS

Original Filed Aug. 20, 1946 3 Sheets-Sheet 2

INVENTORS
ROBERT D. PAULEY
LOUIS A. McCANNA
BY Cook and Schermerhorn
ATTORNEYS

METHOD OF BARKING LOGS

Original Filed Aug. 20, 1946 3 Sheets-Sheet 3

Reissued Jan. 26, 1954

Re. 23,776

UNITED STATES PATENT OFFICE 23,776

METHOD OF BARKING LOGS

Robert D. Pauley, Tacoma, and Louis A. McCanna, Spokane, Wash., assignors to Weyerhaeuser Timber Company, Longview, Wash., a corporation of Washington Original No. 2,576,966, dated December 4, 1951, Serial No. 691,762, August 20, 1946. Application for reissue May 11, 1953, Serial No. 354,441

15 Claims. (Cl. 144—309)

Matter enclosed in heavy brackets [ ] appears in the original patent but forms no part of this reissue specification; matter printed in italics indicates the additions made by reissue.

This invention relates to a novel and improved method for removing the bark from logs.

Various methods have heretofore been employed for removing bark from logs, depending to some extent upon the requirements imposed by the intended use of the wood. In lumber mill operations, for example, the bark does not interfere seriously with the sawing of lumber, and so it has heretofore been left in place, to be eventually eliminated along with a considerable amount of waste wood in the cutting of rectangular cants and lumber from a round log. In preparing so-called peeler logs for cutting wood veneer in a lathe, it has been customary to first remove the bark in a rossing machine, but a considerable amount of wood is thereby wasted because the action of such machines does not stop at the cambium layer. In the barking of pulp logs, also, it is usually desirable to remove the bark cleanly from the wood in order to keep all bark out of the pulping process although no attention has heretofore been given to contamination of the discarded *bark* [brake] by the inclusion of wood slivers and chips torn off by the rossing machines in conventional use.

With increasing utilization of bark products and increasing cost of wood it is becoming more important to keep the bark, as well as the wood, each free of contamination by the other. Conventional rossing machines do not accomplish this clean separation between the bark and the wood, with the result that if all the bark is removed some wood is also removed and the outer layer of wood is damaged to some extent in the removal. Conversely, if the bark is to be kept free of wood, some bark is left on the log in bark removal processes heretofore employed. Other objections to conventional barking machines are their high initial cost and high cost of operation, particularly because of their large power demands.

It is, therefore, an object of the present invention to provide an improved method of barking logs which will separate the bark cleanly from the wood without slivering or otherwise damaging the wood and without including such wood chips and slivers along with the bark. Other objects of the present method are to effect bark removal more quickly and with less expenditure of energy than in conventional barking machines, and to provide a method of barking logs which may be carried out on a commercial scale with a relatively small investment in machinery and plant space, with relatively small power requirements and with a minimum amount of handling of the logs. Another object is to provide a barking method which is suitable and practical for all logs to obtain pure bark, regardless of whether the wood is to be used for pulp, veneer or lumber.

In its broader aspects the method of the present invention comprises the creation of a differential compression in the bark with respect to the wood, and movement of an area of compression relative to uncompressed areas, the compressive force being yielding to follow the contour of the log and not sufficiently great to compress the wood. A moving pressure area is imposed against the bark layer momentarily to compress and then release the bark progressively in successive localized areas to cause the bark to break and separate itself from the underlying wood surface as the pressure area or wave moves over said areas. Such a pressure wave may advantageously be created by pressing a rigid tool in a substantially perpendicular direction against the surface of the bark and then moving said tool relatively over the surface of the bark to move the compressing action to successive new localized areas while compressed areas are released to permit re-expansion of the bark behind the moving tool. The tool may take various forms as will be pointed out hereinafter in connection with the detailed description of apparatus for carrying out the method, but the best results appear to be accomplished with a tool having relatively small area in either line or spot contact with the [bark surface.] *log, said area having small dimensions relatively to the diameter of the log, and said tool having such a form that in its working position there is a wedging space between the tool and the log into which space the bark is crowded by the relative movement between the tool and the log.* When considerable force is applied to the tool in a direction or line of action substantially perpendicular to the bark surface, the bark under the tool is momentarily compressed producing a rather high degree of compression or strain in the cambium layer lying against the sap wood. When this compressive force is moved along the bark to create a moving localized pressure wave, it produces a separation of the bark from the underlying wood causing the bark to break into pieces which cleanly separate from the wood without slivering or otherwise damaging the surface layer of wood.

It is also believed that the traveling pressure wave operates to tension the bark as though by a rubbing action to raise a bulge ahead of the pressure zone, which pulls the bark off the wood surface. Liquid pressure from sap squeezed out of the cambium layer and sap wood around the pressure area may also operate to separate this layer from the wood when there is considerable liquid present in this zone. Still other effects not presently known or understood may also contribute in producing the desired separating action, but it is not intended to limit the invention by analytical explanations except as to the limitations imposed by the appended claims.

In one form of machine which has been devised to carry out the steps of the method, the log to be barked is supported in a lathe for rotation on a horizontal axis. The pressure applying tool is carried on the end of a piston rod extending from an air cylinder disposed approximately radially with respect to the axis of rotation of the log. While the log is rotating air is admitted to the cylinder to press the tool against the bark surface with sufficient force to produce the above described pressure wave in the bark layer without deforming the underlying wood. The cylinder is mounted in a fixed position on a lathe carriage or the like so that as the log revolves the tool and the pressure wave it produces are caused to travel relatively around the log. This action is preferably started at one or more stations along the log, the carriage being traversed along the log to move the tool or tools to new bark areas.

The method will be described in greater detail in connection with the accompanying drawings illustrating a present form of barking machine for carrying out the method, although it is to be understood that the apparatus may take other forms and that the present arrangement of machine elements is not necessarily essential to the successful operation of the method.

In the accompanying drawings:

Figure 3 is an enlarged detail view of the barking tool shown in Figure 1, the roller being illustrated in section;

Figure 1:
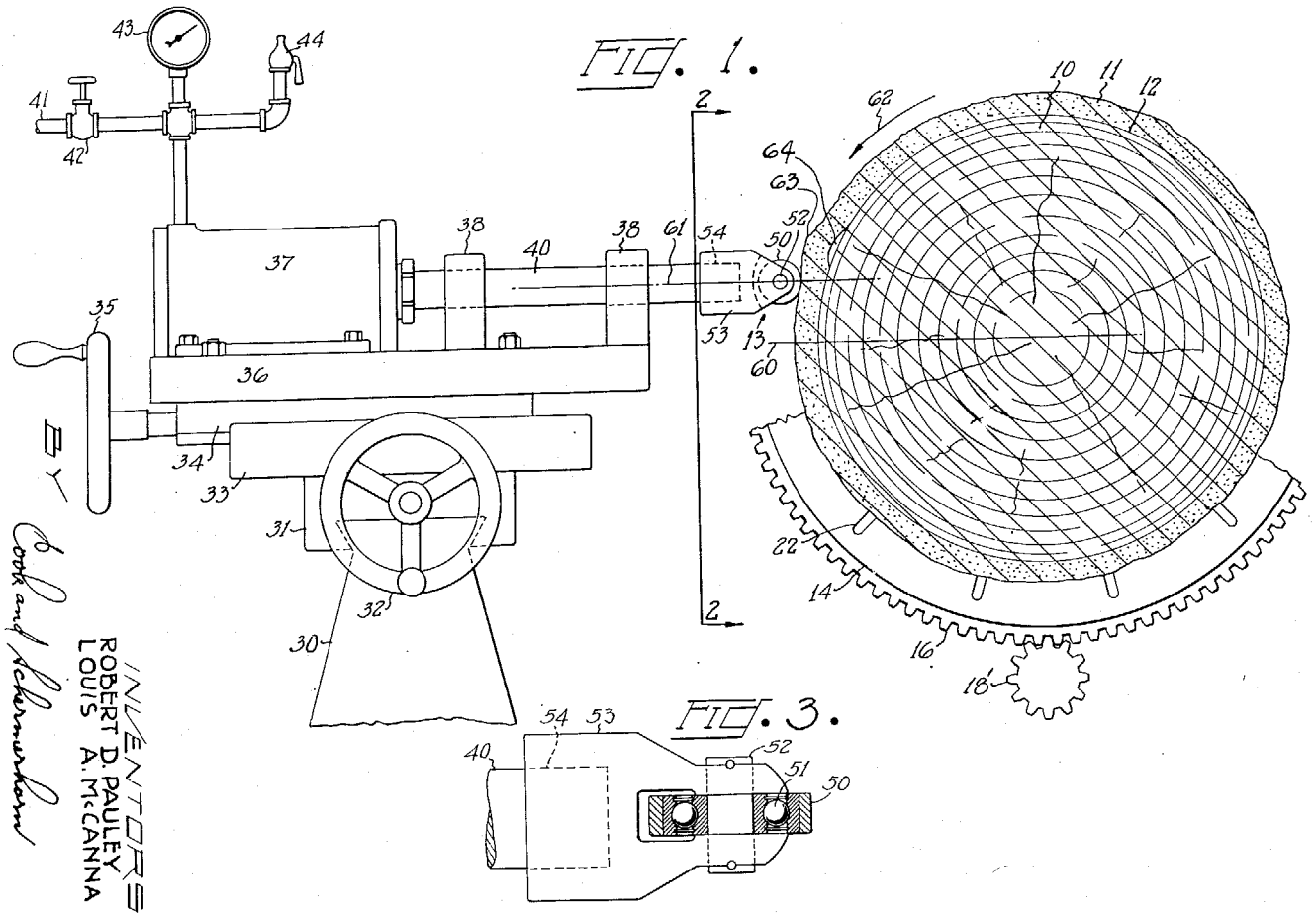
Figure 1 is a cross sectional view through a machine arranged to carry out the method of the present invention on a log mounted therein.

In the apparatus illustrated in the drawings the numeral 10 designates a log having an outer layer of bark 11 adhering to the outer sap wood of the log at the cambium layer 12. Means are provided for rotating this log with respect to a barking tool 13, but it is to be understood that the present method may be practiced by holding the log stationary and moving the tool, and by producing other types of relative movement between the tool and the log than pure circular motion. The relative motion may, for instance, be a combination of longitudinal and circular motions. Any suitable means may be provided for supporting the log for rotation with respect to the tool 13, the present barking machine comprising essentially a large lathe having sufficient capacity to receive logs of the desired length and diameter. The lathe illustrated has a pair of face plates 14 and 15 integrally associated with large spur gears 16 and 17 by which they may be rotated by suitable driving mechanism. The gear 16 and face plate 14 in the present instance are driven by a small pinion 18' with the face plate 15 and gear 17 remaining stationary, although these elements may also be driven by another pinion gear if desired. The log 10 has square cut ends to which are attached the plates 18 and 19 geometrically centered on each end surface. The plate 18 is supported on a spindle 20 and rotated by integral lugs or dogs 21 projecting into the usual radial slots 22 in the face plate 14. The plate 19 is supported by a spindle 23 which may be moved axially by a hand wheel 24 in chucking and unchucking the log. This chucking arrangement provides for centering the log on the spindles so as to equalize, as far as possible, any eccentricity or lopsided growth whereby the log is rotated substantially on its geometrical axis without regard to the position of the center of the growth rings of the wood. The power drive for the pinion [18] *18'* includes the usual clutch and speed changing mechanism to control the surface speed of the log relative to the tool 13. Other chucking arrangements may be devised for logs not having square cut ends.

The numeral 30 designates a rigid supporting member for a carriage 31 which may be traversed along the length of the log by means of a hand wheel 32. The carriage 31 is provided with a cross slide 33 for a tool support 34 which may be moved radially of the lathe axis by means of a hand wheel 35 to adjust a tool in accordance with the diameter of the work in the lathe. On the tool support 34 is fixedly mounted a base 36 carrying an air cylinder 37 and a pair of slide bearings 38 for a piston rod 40. The barking tool 13 is mounted on the end of the piston rod in a position to engage and press in a substantially radial direction against the bark surface of the log as the latter rotates in the lathe, the cylinder 37 being of sufficient length to provide a piston rod stroke in excess of variations in the radius of the log as chucked. Adjustment for different size logs is made through crank 35 so that the piston will not reach either end of its stroke as the lobes and hollows on the bark surface pass under the barking tool.

Operating air for the cylinder 37 is introduced through a pipe 41 under the control of a manual valve 42. The numeral 43 designates a pressure gauge and the numeral 44 an exhaust valve for relieving the pressure in the cylinder when the valve 42 is shut off. This arrangement provides a single acting pressure cylinder in which the piston rod may be retracted by hand when the valve 44 is opened, but a double acting cylinder may be used having a four way valve connected in the usual manner to retract the piston rod by air pressure if desired. The gauge 43 indicates the operating pressure in the cylinder, and the valve 42 is preferably of a type which may be cracked slowly and then closed to produce an operating pressure less than the pressure in the line 41 when desired.

Different forms of barking tool may be used in practicing the method of the invention. The tool 13 comprises a roller 50 mounted on ball bearings 51 for rotation around a central pin 52 in a bifurcated block 53 having a socket 54 receiving the end of the piston rod 40. In the present embodiment the roller 50 is relatively narrow and small in diameter in relation to the dimensions of the log, the optimum dimensions for the diameter and width of the roller being determined principally in relation to the operating force exerted upon the piston rod to produce the desired unit pressure against the bark. The roller in Figure 1 has a radius approximately equal to the thickness of the bark but this relationship is not critical as the present roller produces a satisfactory barking action on bark several times as thick in relative dimensions. *The tool 13 as illustrated is cylindrical and hence in every position on the log to be barked it provides on each side a wedging space between it and the cambium layer into which bark may be crowded by relative movement of the tool and log in either of two opposite directions.*

The line 60 indicates the level of the spindle centers in the lathe, which is here shown as coinciding with the growth center of the log, and the line 61 designates the axis of the piston rod 40. In Figure 1 it will be noted that the piston rod axis 61 is horizontal and slightly above the center of the lathe spindles. This relationship is not important to the use of the roller tool 13, but is of importance in connection with another form of barking tool to be presently described. The barking tool 13 is thereby seen to have a line of action on the line 61, causing the relatively small cylindrical roller 50 to be pressed into the bark in a circular track around the log as the latter revolves. The roller rides over the bark irregularities and produces a traveling pressure wave extending laterally forwardly and rearwardly on all sides of the roller, and inwardly through the cambium layer to the relatively hard sap wood surface underneath. The pressure of the air employed in the cylinder 31 is sufficient to produce some compressive deformation and crushing of the bark immediately under the roller whereby the roller has actual contact with the bark surface over a considerable portion of the projected area of the roller as shown.

In a barking operation the log is first chucked in the manner described and the lathe put in operation to rotate the log in the direction indicated by the arrow 62. Compressed air is then admitted to cylinder 37 to build up a desired indicated pressure in the gauge 43 to press the tool 13 against the bark surface with the necessary unit pressure on the bark. The barking operation may be started at any point along the log, but when a single barking tool is used it is most expedient to begin with the first contact of the tool at one end of the log. Pressure of the tool causes pieces of bark extending several inches on either side of the tool track to separate themselves from the underlying wood and break off from the surrounding bark leaving spots of bare wood exposed. As the log revolves and the tool moves horizontally, additional pieces of bark break off in the same manner until the log is substantially bark free.

As the roller passes over the bark it alternately rolls and slides as bark fragments become wedged in the included angle between the solid bark surface and the arcuate surface of the roller. Since the included angle between the roller and the bark surface widens from a zero value at the point of tangency up to 90 degrees at the side of the roller, it is considered to be relatively unimportant whether the line of action 61 on the tool is directed on a level above the spindle level or coincident therewith. In any case, the included angle between the roller and the solid bark surface forms a wedging space in which the unit pressure increases from zero to a maximum at some point on the periphery of the roller. The point of maximum unit pressure appears to shift forwardly of the point of tangency when loose bark material piles up under the roller to produce a sliding rather than a rolling contact, but in either case the tool produces a compression pressure wave extending through the cambium layer of the bark and traveling around the log, which pressure wave is found to be effective in removing the bark from the log.

The optimum values of the maximum unit pressure and the speed of travel of the pressure wave depend upon the species of tree, the size of tree, thickness of bark, the condition of the bark, and other variables. The condition of the bark at the time of the barking operation is affected by the conditions of growth under which the bark was formed, by the season of the year in which the tree was cut, and by the nature and duration of the seasoning of the log between the time the tree was felled and the barking operation. The condition of the bark is also, of course, affected by the latitude, altitude and climatic conditions of the locality where the tree grew. In view of these many variables which must be taken into consideration, applicants do not deem it important to specify particular values for unit bearing pressures of the tool and relative speeds of the tool with respect to the bark surface. It will, therefore, be apparent that the speed of the lathe and the operating pressure of the cylinder are to be regulated and coordinated by experience in accordance with the type and surface area of the barking tool to produce the mode of operation herein described. When different logs are received in the barking mill it becomes necessary to change these variables just as adjustments must be made for different kinds and conditions of wood in other wood and wood product treating apparatus. It has been found that when the air pressure is too low or the lathe speed too great, bark is not satisfactorily removed, and, of course, it is obvious that there would be a certain minimum air pressure below which the tool would have no appreciable effect upon the bark. A high operating pressure, of course, increases the size of the machinery from a strength standpoint and increases the power demands of the lathe. Assuming the machine to be sufficiently strong and powerful, a limitation on the maximum operating pressure is imposed by the amount of damage to the wood surface which may be tolerated. In general, a higher operating pressure removes bark more quickly. That is to say that with the optimum speed of rotation, fewer turns are required in the same track or region. However, if the operating pressure is too high a certain amount of slivering occurs in the sap wood layer, caused by the pressure of the tool against the log, which is objectionable both because of damage to the wood and because of the inclusion of wood slivers in the removed bark. The general rule of thumb may, therefore, be advanced that it is advantageous to increase the operating pressure up to just less than the point where slivering of the wood occurs, to attain the maximum barking speed consistent with the desired quality of the product.

*With bark between the tool and the cambium layer there is no danger of slivering the wood below the bark. The danger of slivering arises when the bark is absent and the full force of the tool is exerted on the wood. Where wood-free bark is desired the force exerted by the tool must be insufficient to effect slivering in the circumstance that the tool rides wholly on the wood. Bark on many logs lacks tensile strength when separated from the wood, so that in movement*

*of the tool over a log the bark breaks and falls away in pieces. Otherwise, the bark would be merely loosened as a sleeve around a wholly debarked log. On many logs when the tool is started at one end of the log and is relatively moved in a circumferential band about it riding only on the bark, the tool may make several revolutions before a piece of the bark breaks away from the loosened band of bark, the loosening being effected by compression and release as described. When the tool approaches the resulting bared region, it moves into it and then rides on the bared wood. Under this condition the active force from the tool on the log may be sufficient to cause slivering and it may be lessened by control to avoid slivering.*

*It is at this point that the said wedging space becomes highly important in action which may follow. As the bared region moves relatively to the tool, the edge of the approaching bark which bounds the bared area rides into the wedging space while the tool bears on the wood. The tool either climbs up onto the bark or it remains on the wood. When it remains on the wood the action involves compression and release with shearing. The bark is crowded into the nip between the tool 13 and the cambium layer. Being relatively spongy compared to the wood, the bark is densified to a more solid form in the nip to a point where is it blocked and held stationary in the nip while the log moves on, all relatively to the tool. This results in separating the compressed bark from the wood at the cambium layer forward of the tool by a shearing action at the cambium layer. During this action there is an important accompanying condition which greatly lessents any slivering tendency of the tool on the bared wood, so that if there is an applied force which is sufficient to sliver the wood, it is rendered insufficient under the existing conditions. In compressing the bark in the nip as aforesaid, the total force applied to the tool is divided, one component less than the whole being exerted directly on the wood and another component less than the whole being exerted on the bark compressed in the nip.*

*When the total applied force is decreased to the point that the said edge of the bark at a bared spot will lift the tool and ride under the tool, then the action of debarking is that of compression and release as first described, but that type of action is relatively slower than the action of compression and release with shearing. Accordingly, by increasing the force from the tool up to just less than the point where slivering of wood would occur with all the force applied to the wood, the maximum barking speed without slivering may be attained.*

Figure 2:
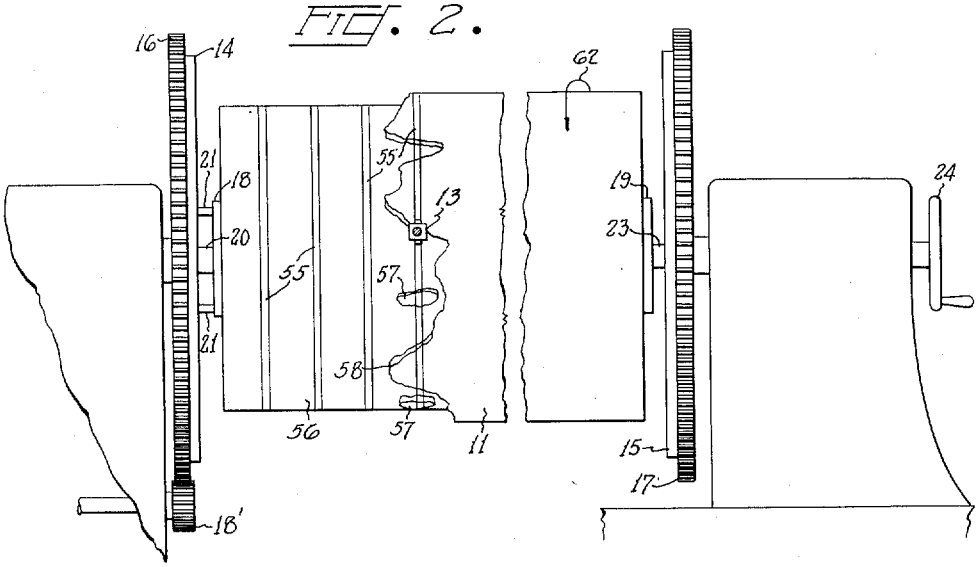
Figure 2 is a side elevation view taken on the line 2—2 of Figure 1, showing the nature of the barking action accomplished by the present method.

Figure 2 illustrates the action of the barking tool in removing bark in the manner described. The numeral 55 designates successive tracks made by the roller element 50 in different adjusted positions of the carriage 31 along the log. For the purpose of illustrating the action of the barking tool, it is assumed in Figure 2 that the carriage is maintained in a fixed position until all the bark is removed from a particular zone of the log, after which the carriage is moved to a new position to repeat the action on a new zone of bark. Thus the distance between successive tracks 55 indicates the amount of movement of the carriage between its successive positions. It is, of course, understood that instead of shifting the carriage in increments from one fixed operating position to the next, it may be moved slowly and continuously by a screw thread or other continuous feed or traversing mechanism.

In Figure 2 the bark has been completely removed from the left end of the log, exposing the bare sap wood in the region designated by the numeral 56, the unbarked area being designated by the numeral 11. The log has accordingly made several turns with the tool in its present position, making a track 55 which is indicated by definite lines on the drawing but which, in fact, may not readily be visible to the eye until still more turns have been made. With the log turning in the direction indicated by the arrow 62, it will be seen that some of the bark has already been removed from the previous passages of the tool thereover, and that in the passage of the tool depicted in the drawing most of the remaining bark has been removed, leaving in view at the instant depicted only the islands of bark 57 and a peninsula of bark 58 behind the tool. Such islands and peninsulas of bark may be sheared off in individual chunks when the tool next encounters the edge thickness of bark, but if the bark does not yield immediately to a shearing action the roller will climb up on the outer surface of the bark and subject these areas to further pressure treatment until the bark finally yields and becomes detached from the underlying wood. *As stated above, an increase of the force applied to the tool up to a value just short of the slivering point, will generally be effective to prevent the roller 50 climbing up the edge of island 57 or peninsula 58, with the result that the bark is released in chunks at the cambium layer when the tool encounters such edge. The force to shear comes from the relative rotation between the tool and the log.* The piston rod 40 is moved back and forth against the resilient cushion of air in the cylinder 37 as the roller passes over the irregular surface. Thus on each successive passage of the tool in the last track 55, the bark area diminishes and the bare wood area increases until all the bark is gone.

If the carriage 31 is traversed gradually the action is the same except that the track 55 makes a continuous spiral so that the center of the roller never passes over the same point twice. Nevertheless, the pressure wave produced by the roller passes repeatedly over each area of the log until it has moved into a new zone, the rate of traverse being regulated to produce a maximum rate of bark removal.

If higher air pressures are employed the length of the face of the roller 50 may be made correspondingly longer for line contact instead of spot contact to apply the pressure wave over a greater length of log to remove more bark in each 360 degrees of track. If the carriage is traversed by a continuous feed, the feed rate may be adjusted to a higher speed when a longer roller is used.

This method of barking is very economical of mechanical energy. The air pressure supply for the cylinder 37 has very little demand thereon because its only function is to hold the barking tool resiliently against the log. Also, relatively little energy is required to turn a fairly smooth round log under the barking tool when the log is properly chucked in the lathe. Additional torque is required to produce a shearing action on the bark, and if the roller 50 is of such diameter in relation to the bark thickness that considerable shearing action occurs against the edges of *the bark or of* islands and peninsulas of bark, then sufficient torque must be supplied momentarily by motor or flywheel to meet these additional demands, but in return for this additional energy input a higher speed of bark removal is obtained. On large diameter trunk sections where the bark is unusually thick and rough on its surface, a relatively large additional amount of energy may be required to perform the shearing function, but in such case there is an increased yield of bark to justify the added energy requirements. On the whole, the present method is much quicker and more economical in its power requirements than conventional methods of barking logs.

One explanation of the action of the pressure wave in initially loosening the bark from the wood is illustrateed in Figure 1. The bark layer appears to be stretched and moved by the roller 50 to some extent in somewhat the manner that a dough sheet is stretched by a rolling pin, or a carpet is moved on the floor under a rolling wheel. The numeral 63 designates a bulge raised by such stretching and movement, comparable to the bulge raised in the dough sheet or carpet ahead of a rolling object, which bulge in the bark tends to raise the cambium layer underneath, as *exaggeratedly* [exaggerately] represented by the space 64 left between the bark and the wood. Applicants do not necessarily propose this explanation as the predominant action of the roller, but merely mention the possibility that this effect contributes materially to the loosening of the bark, regardless of whether the barking tool takes the form of a roller or button.

However, even if the actual bark displacement, or movement, laterally by way of stretching is very small, or inconsequential, in a particular specimen, it is *nevertheless* [nevertheless] evident that under the point or line of application of pressure the relatively yieldable bark is locally compressed against the relatively hard wood surface underneath. This differential compression tends to produce a concave curvature in the bark stratum to pull or lift the bark cambium layer off the undeformed wood surface around the perimeter of the pressure zone. Expressed in terms of stress and strain the differential compression phenomenon may be said to comprise a central zone of perpendicular compression producing bending strains in the bark extending outwardly beyond the margin of the compression zone, and perpendicular tension in the bark and between the bark and wood immediately around the compression zone. Thus the pressure wave is so-called because it produces in the bark layer a central zone of compression surrounded by a perimetric zone of tension which may be visualized as producing a saucer-like deformation of the bark layer when the pressure is applied by "point" contact. When the pressure is applied by "line" contact the deformation is trough shaped.

When such a pressure wave is moved relative to the bark the tension zone manifests itself as a bulge predominantly on its leading side, referred to the relative direction of motion, as shown in Figure 1. This eccentric strain pattern is believed to be due not only to lateral stretching or pulling of the bark as explained above, but also to the fact that the bark does not quickly expand perpendicularly immediately behind the tool as a perfectly elastic medium. Mechanical hysterysis of the bark material would, of course, operate to make the radius of curvature of the bark depression less on the trailing side than on the leading side of the tool. Thus by moving the tool relative to the bark the bending and tension strains are amplified on the leading side of the pressure center sufficiently to cause separation and breakage of the bark. As hereinabove mentioned, applicants do not preclude the possibility that still other factors, presently unknown, may contribute materially to the loosening of the bark, but the foregoing explanations appear to be consistent with the observed operation of the apparatus.

Figure 4:
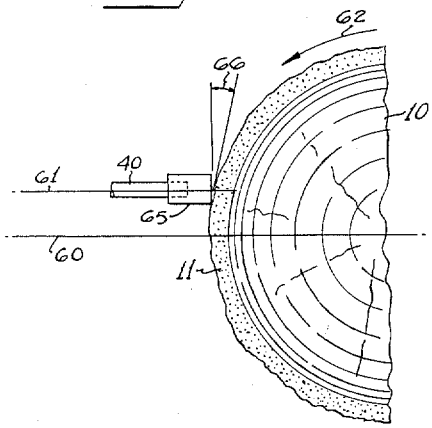
Figure 4 is a fragmentary cross sectional view showing a different form of barking tool which may be employed in the performance of the present method[, and]

A different form of barking tool is shown in Figure 4. The tool 65 is merely a steel button having a square face, with rounded edges, in a plane perpendicular to the piston rod 40. By reason of the position of the piston rod on the line 61 slightly above the level 60 of the lathe spindles, there is a small included angle *or wedging space* 66 between the face of the tool and the generally arcuate surface of the bark on the log. This produces an eccentric loading of the tool with a region of maximum unit pressure along the trailing edge of the tool and a region of relatively small unit pressure on that part of the tool face which first encounters the bark. This tool exerts a rubbing action which, by reason of the force applied to the piston rod, creates a traveling pressure wave extending through the cambium layer of the bark with the same general result produced by the previously described tool 13. On a relatively smooth bark surface before any pieces of bark have been dislodged, the action of the tool 65 is substantially the same as the action of the tool 13, but, after pieces of bark have broken out, the side of the tool exerts somewhat more shearing action against the edges of the bark islands and peninsulas than is exerted by the roller surface 52. This advantage is desirable for rapid barking, but it imposes severe stresses on the mechanism when the bark is thick and tight. For this reason the barking tools 13 and 65 are interchangeable in the present apparatus with the tool 13 operated on the line of action 61 which is found best for the tool 65. The two tools may thereby readily be interchanged to exert the most effective action on different types of bark. The tool 65, in general, imposes the same operating limitations as the tool 13. Higher operating pressures produce faster bark removal, but these must not be high enough to damage the sap wood and contaminate the bark with wood slivers when the tool rubs on the bare wood.

Figure 5:
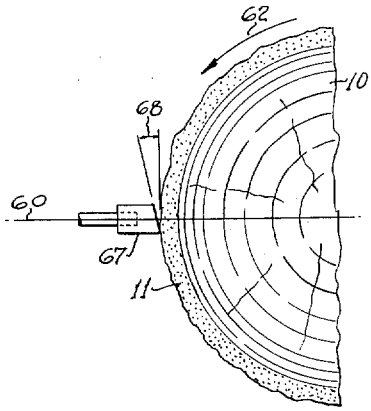
Figure 5 is a similar view of a modification of the type of tool shown in Figure 4[.], *and;*

Another form of barking tool is shown in Figure 5. Here the tool 67 has a rubbing face in a plane forming an angle 68 with a plane perpendicular to the *piston* [pitson] rod 40. The piston rod 40 may thereby be disposed with its line of action coincident with the level line 60 through the lathe centers. The face angle 68 then becomes the included angle between the tool face and a tangent to the bark surface[.] *providing a wedging space between the tool and the cambium layer converging tangentially of the latter.* As has previously been stated, the roller tool 13 may also be employed on this line of action, thus making it interchangeable with the tool 67 as well as with the tool 65.

Figure 6:
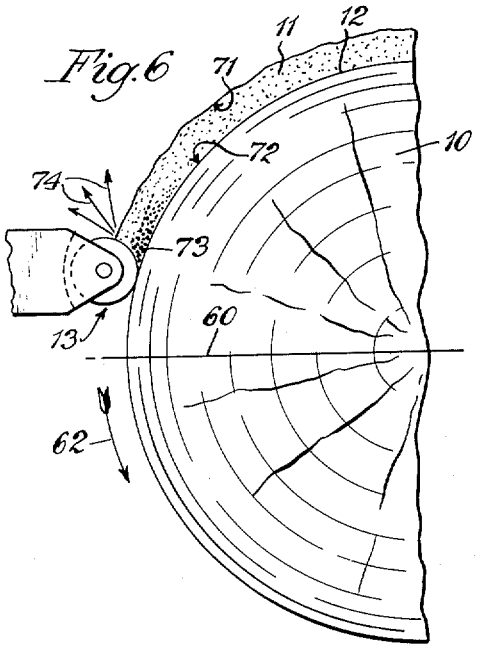
*Figures 6, 7 and 8 are illustrations of action which may occur with the tools and arrangements respectively of Figures 1, 4 and 5.*
Figure 7:
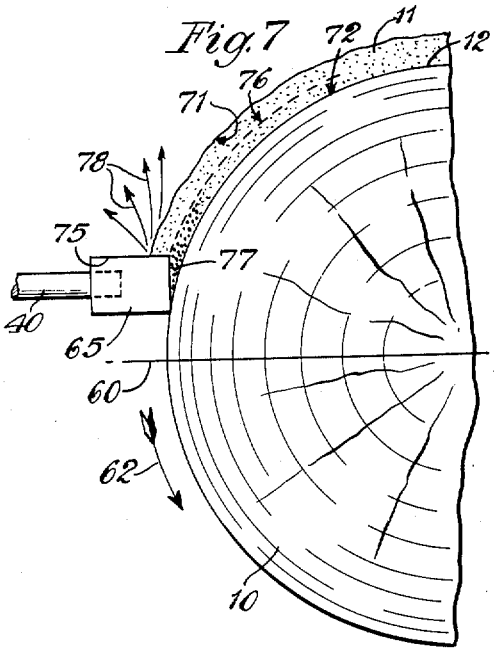
Figure 8:
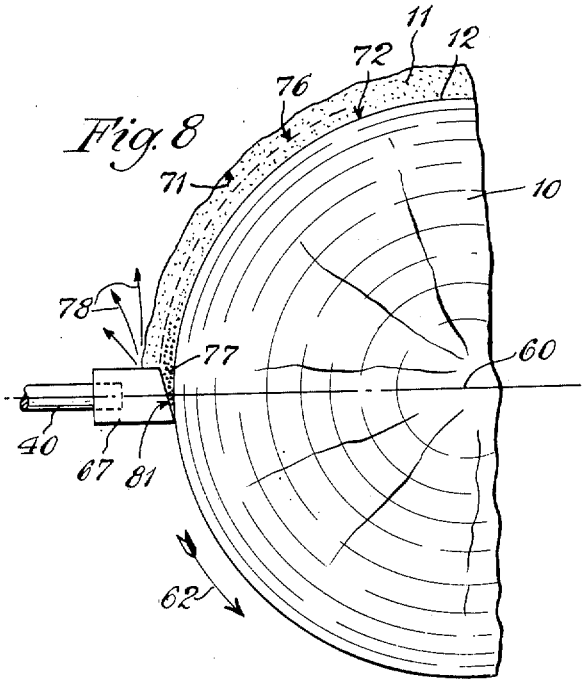

*Figures 6, 7 and 8 show the described action of compression and release with shearing, respectively, by the tools 13, 65 and 67. The illustrations are diagrammatic because actual conditions are complicated by the bark being removed as it moves away from the tool and the log at the same time that the illustrated action occurs.*

*Figure 6 represents the tool 13 of Figure 1 as it acts on the log while approaching the bark edge of an island 57 or peninsula 58 as described with*

*reference to Figure 2. The tool 13 rides on the already exposed cambium layer 12. As illustrated, the bark 11 is as thick as the radius of the tool. The outer layer 71 of the bark approaches an obstructing wall provided by a portion of the cylindrical face of the tool 13 and thus encounters a force tending to shear it from the underlying layer of bark. The inner layer 72 of the bark approaches the nip 73 between the roller 13 and the cambium layer 12 at such an angle that it becomes compressed in the nip, the more so the deeper it enters. From the inner layer 72 to the outer layer 71 the action changes from compression of the bark onto the wood substantially radially of the log at the tip of the nip to simple mechanical shearing at the outer layer 71. In the wedging space represented by the nip 73, the bark compress becomes more and more dense to the point where it acts somewhat as a solid and as such is held stationary while the log moves on in the direction of arrow 62. This shears the bark from the wood at the cambium layer. These extremes of action result in forcing loosened bark outwardly as indicated by the arrows 74. It is to be understood that the foregoing explanation depicts the forces and action, without attempting to indicate the complications resulting from bark escaping from the nip blocking the entrance of bark into the nip. The releasing action at the cambium layer and the shearing action at the outer layer 71 no doubt oscillate over a range extending away from the tool by reason of the escaping bark.*

*Figure 7 illustrates the shearing action with the tool 65 of Figure 4. As stated above the side 75 of the tool 65 acts to shear bark when acting against the edges of bark. The outer layer 71 of the bark lies where a thickness of it inwardly to the dotted line 76 approaches the tool side 75 and is mechanically sheared or scraped away from the inner region between the line 76 and the inner bark face 72. The inner bark portion 76—72 is so positioned that it enters the wedge-like space 77 between the log-contacting area of the tool 65 and the cambium layer 12. In this space 77 the bark is compressed and sheared from the wood of log 10 at the cambium layer 12 as described with reference to Figure 6, the escaping bark being represented by the arrows 78.*

*Figure 8 illustrates the shearing action with the tool 67 of Figure 5. The action is the same as in Figure 7, only the shape of the tool and its location differ. Because the tool 67 has a biased face 81 it may ride on the radial line 60 as illustrated. The numerals and explanations given in Figure 7 apply also to Figure 8.*

*It is to be understood that the direction of movement of the tool is such that the described wedging space advances to crowd bark into it, the preferred motion in the case of a single tool being such as to create a spiral path around the log.*

Although only a single tool 13 has been shown in the drawings to illustrate the method of the invention it is apparent that a gang of such tools may be mounted on individual piston rods in a plurality of cylinders carried by the carriage 31 to increase the output of the machine and reduce the carriage travel. Quick chucking means are also desirable to reduce the time and handling for each log.

Still further variations in the construction and arrangement of apparatus for practicing the method will occur to persons skilled in the art, and all such modifications of the application of the method within the scope of the appended claims are included in the invention.

Having now described our invention and in what manner the same may be used, what we claim as new and desire to protect by Letters Patent is:

1. The method of barking a log such as used for the production of wood veneer, pulp and the like, comprising impressing against the surface of the bark an approximately radially directed compressive force over an area of small dimensions relative to the diameter of the log to follow the contour of the log, and moving the compressive force longitudinally and circumferentially of the log, said force being of sufficient intensity to compress the bark and cause failure of the bond between the bark and the log.

2. The method of removing the bark from logs such as used for the production of wood veneer, pulp and the like, comprising applying against a small area of the bark surface on a log a continuous compressive force of sufficient intensity to cause the bark to break and separate from the log, and moving the point of application of said force relatively around and longitudinally of the log and into hollows and depressions in the bark surface for removing the bark from the log in the path of said movement.

3. The method of removing bark from logs as defined in claim 2 wherein the compressive force is applied against the bark surface of the log in substantially a radial direction.

4. The method of removing the bark from logs comprising supporting a log by its ends, applying a continuous compressive force against a small area of bark surface on the log of sufficient intensity to cause failure of the bond between the bark and the log, creating relative longitudinal movement between the log and the point of application of said force, and rotating the log to move the point of application of said force around said log and into hollows and depressions in the bark surface for removing the bark from the log in the path of said movement.

5. The method of removing the bark from logs such as used for the production of wood veneer, pulp and the like, comprising applying a localized pressure against a small area of the bark on a log, moving said pressure relatively around and longitudinally of the log and into hollows and depressions in the surface of the log, said pressure being of sufficient intensity to cause the bark to break and separate from the underlying wood surface.

6. The method of removing bark from logs as defined in claim 5 wherein the surface of the log is moved under a rolling pressure.

7. The method of removing bark from logs such as used for the production of wood veneer, pulp and the like, comprising imposing a localized pressure against the bark within an area of small dimension relative to the surface of the log and of sufficient intensity to cause the bark to break and separate from the log, and moving the area of application of said pressure relatively around and longitudinally of the log to create a traveling pressure against the bark layer.

8. The method of removing bark from logs as defined in claim 7 wherein the pressure imposed against the bark is a yieldable pressure.

9. The method of removing bark from logs as defined in claim 7 wherein the pressure is sufficient to break the bark and cause it to separate from the log at the cambium layer but is insufficient to crush the wood on the surface of the log.

*10. The method of barking a log such as used*

*for the production of wood veneer, pulp and the like, comprising impressing against the surface of the log an approximately radially directed compressive force over an area of small dimensions relative to the diameter of the log to follow the contour of the log, and moving the compressive force longitudinally and circumferentially of the log, said force being of sufficient intensity to compress the bark and cause failure of the bond between the bark and the remainder of the log.*

*11. The method of barking a log such as used for the production of wood veneer, pulp and the like comprising impressing against the surface of the log an approximately radially yielding and directed compressive force over an area of small dimensions relative to the diameter of the log to follow irregularities in the contour of the log, and simultaneously forming a wedging space between said area and the cambium layer which space extends substantially tangentially to the log, and relatively moving the compressive force circumferentially of the log in a direction to crowd bark into said wedging space, said force being of sufficient intensity to compress the bark and cause failure of the bond between the bark and the remainder of the log.*

*12. The method of barking a log such as used for the production of wood veneer, pulp and the like comprising impressing against the surface of the log an approximately radially yielding and directed compressive force over an area of small dimensions relative to the diameter of the log to follow irregularities in the contour of the log, and simultaneously forming a wedging space between said area and the cambium layer which space extends substantially tangentially to the log, and relatively moving the compressive force longitudinally and circumferentially of the log in a direction to crowd bark into said wedging space, said force being of sufficient intensity to compress the bark and cause failure of the bond between the bark and the remainder of the log.*

*13. The method of removing bark from logs which comprises applying a yielding substantially constant compressive force to a log in a substantially radial direction over an area of small dimensions relative to the diameter of the log to follow irregularities in the contour of the log, and simultaneously forming a wedging space between said area and the cambium layer which space extends substantially tangentially to the log, relatively moving the compressive force circumferentially of the log in a direction to crowd the inner layer of bark into said wedging space, and shearing the outer layer of bark from said inner layer at the entrance to said wedging space, said force being of sufficient intensity to compress the bark and cause failure of the bond between the bark and the remainder of the log.*

*14. The method of removing bark from logs which comprises applying a yielding substantially constant compressive force to a log in a substantially radial direction over an area of small dimensions relative to the diameter of the log to follow irregularities in the contour of the log, and simultaneously forming a wedging space between said area and the cambium layer which space extends substantially tangentially to the log, relatively moving the compressive force longitudinally and circumferentially of the log in a direction to crowd the inner layer of bark into said wedging space, and shearing the outer layer of bark from said inner layer at the entrance to said wedging space, said force being of sufficient intensity to compress the bark and cause failure of the bond between the bark and the remainder of the log.*

*15. The method of barking a log which comprises applying a substantially constant yielding compressive force substantially radially to the curved surface of a log over an area of small dimensions relative to the diameter of the log to follow irregularities in the contour of the log, and simultaneously forming a wedging space between said area and the cambium layer, and relatively moving the compressive force in a direction to crowd bark into said wedging space, said force being of sufficient intensity to compress the bark and cause failure of the bond between the bark and the remainder of the log.*

ROBERT D. PAULEY.
LOUIS A. McCANNA.

References Cited in the file of this patent or the original patent

UNITED STATES PATENTS

| Number | Name | Date |
|---|---|---|
| 305,322 | Merziger | Sept. 16, 1884 |
| 871,296 | Russell et al. | Nov. 19, 1907 |
| 1,277,808 | Witham, Jr. | Sept. 3, 1918 |
| 1,670,723 | Hummel | May 22, 1928 |
| 1,881,465 | Ganes et al. | Oct. 11, 1932 |
| 1,951,084 | Council | Mar. 13, 1934 |

FOREIGN PATENTS

| Number | Country | Date |
|---|---|---|
| 90,080 | Germany | Jan. 2, 1897 |
| 125,776 | Germany | Dec. 4, 1901 |
| 4,404 | Australia | Oct. 25, 1926 |